United States Patent
McDonald

(10) Patent No.: US 6,745,197 B2
(45) Date of Patent: Jun. 1, 2004

(54) SYSTEM AND METHOD FOR EFFICIENTLY PROCESSING MESSAGES STORED IN MULTIPLE MESSAGE STORES

(75) Inventor: David T. McDonald, Seattle, WA (US)

(73) Assignee: Preston Gates Ellis LLP, Seattle, WA (US)

(*) Notice: Subject to any disclaimer, the term of this patent is extended or adjusted under 35 U.S.C. 154(b) by 312 days.

(21) Appl. No.: 09/812,749

(22) Filed: Mar. 19, 2001

(65) Prior Publication Data

US 2002/0161788 A1 Oct. 31, 2002

(51) Int. Cl.$^7$ .............................................. G06F 17/30
(52) U.S. Cl. ..................... 707/102; 707/104.1; 709/200
(58) Field of Search ............................. 707/102, 104.1; 709/200

(56) References Cited

U.S. PATENT DOCUMENTS

| | | | | |
|---|---|---|---|---|
| 4,653,048 A | * | 3/1987 | Anderson et al. ............. 714/49 |
| 5,317,568 A | * | 5/1994 | Bixby et al. ................. 370/401 |
| 5,757,669 A | * | 5/1998 | Christie et al. ............. 709/205 |
| 5,905,863 A | | 5/1999 | Knowles et al. |
| 6,219,715 B1 | * | 4/2001 | Ohno et al. ................. 709/245 |
| 6,223,209 B1 | * | 4/2001 | Watson ....................... 709/201 |
| 6,330,589 B1 | * | 12/2001 | Kennedy ..................... 709/206 |
| 6,438,564 B1 | * | 8/2002 | Morton et al. ............... 715/500 |
| 6,442,592 B1 | * | 8/2002 | Alumbaugh et al. ........ 709/206 |
| 6,484,196 B1 | * | 11/2002 | Maurille ..................... 709/206 |
| 6,507,847 B1 | * | 1/2003 | Fleischman .................. 707/101 |
| 6,523,063 B1 | * | 2/2003 | Miller et al. ................. 709/206 |
| 2001/0056362 A1 | * | 12/2001 | Hanagan et al. ............... 705/7 |

OTHER PUBLICATIONS

"Distribution Duplication Prevention Mechanism," Keneneth Mason Publications, No. 336, p. 261, Apr. 1992 (Great Britain).

* cited by examiner

*Primary Examiner*—Wayne Amsbury
(74) *Attorney, Agent, or Firm*—Patrick J. S. Inouye

(57) ABSTRACT

A system and method for efficiently processing messages stored in multiple message stores is described. Metadata identifying a range of topically identical messages extracted from a plurality of message stores storing a multiplicity of messages to be processed is iteratively copied. The metadata for the extracted range of topically identical messages is categorized. Those messages containing substantially duplicative content within the extracted range are identified as duplicate messages. Those non-duplicate messages within the extracted range are tallied into an ordering of conversation thread length. Those messages whose content is recursively-included content within another of the tallied non-duplicate messages are classified as near-duplicate messages. The remaining messages are designated as unique messages containing substantially non-duplicative content.

30 Claims, 13 Drawing Sheets

81 { From: User1 [User1@aol.com]
Sent: Monday, January 22, 2001 8:33 PM
To: User3@aol.com
Subject: FW: Original Message ← 83

82 { This message is a forwarded email message.

- - - - - Original Message - - - - - - ← 84
77 { From: User2 [mailto: User2@aol.com]
Sent: Monday, January 22, 2001 8:31 PM
To: User1
Subject: RE: Original Message ← 79

78 { This message is a reply email message.

- - - - - Original Message - - - - - - ← 80
75 { From: User1 [mailto: User1@aol.com]
Sent: Monday, January 22, 2001 8:30 PM
To: User2@aol.com
Subject: Original Message ← 76

74 { This message is an original email message.

} 71
} 72
} 73

SYSTEM AND METHOD FOR EFFICIENTLY PROCESSING MESSAGES STORED IN MULTIPLE MESSAGE STORES

FIELD OF THE INVENTION

The present invention relates in general to stored message categorization and, in particular, to a system and method for efficiently processing messages stored in multiple message stores.

BACKGROUND OF THE INVENTION

Presently, electronic messaging constitutes a major form of interpersonal communications, complimentary to, and, in some respects, replacing, conventional voice-based communications. Electronic messaging includes traditional electronic mail (e-mail) and has grown to encompass scheduling, tasking, contact and project management, and an increasing number of automated workgroup activities. Electronic messaging also includes the exchange of electronic documents and multimedia content, often included as attachments. And, unlike voice mail, electronic messaging can easily be communicated to an audience ranging from a single user, a work group, a corporation, or even the world at large, through pre-defined message address lists.

The basic electronic messaging architecture includes a message exchange server communicating with a plurality of individual subscribers or clients. The message exchange server acts as an electronic message custodian which maintains, receives and distributes electronic messages from the clients using one or more message databases. Individual electronic messaging information is kept in message stores, referred to as folders or archives, identified by user account within the message databases. Generally, by policy, a corporation will archive the message databases as historical data storing during routine backup procedures.

The information contained in archived electronic messages can provide a potentially useful chronology of historically significant events. For instance, message conversation threads present a running dialogue which can chronicle the decision making processes undertaken by individuals during the execution of their corporate responsibilities. As well, individual message store archives can corroborate the receipt and acknowledgment of certain corporate communications both locally and in distributed locations. And the archived electronic message databases create useful audit trails for tracing information flow.

Consequently, fact seekers are increasingly turning to archived electronic message stores to locate crucial information and to gain insight into individual motivations and behaviors. In particular, electronic message stores are now almost routinely produced during the discovery phase of litigation to obtain evidence and materials useful to the litigants and the court. Discovery involves document review during which all relevant materials are read and analyzed. The document review process is time consuming and expensive, as each document must ultimately be manually read. Pre-analyzing documents to remove duplicative information can save significant time and expense by paring down the review field, particularly when dealing with the large number of individual messages stored in each of the archived electronic messages stores for a community of users.

Typically, electronic messages maintained in archived electronic message stores are physically stored as data objects containing text or other content. Many of these objects are duplicates, at least in part, of other objects in the message store for the same user or for other users. For example, electronic messages are often duplicated through inclusion in a reply or forwarded message, or as an attachment. A chain of such recursively-included messages constitutes a conversation "thread." In addition, broadcasting, multitasking and bulk electronic message "mailings" cause message duplication across any number of individual electronic messaging accounts.

Although the goal of document pre-analysis is to pare down the size of the review field, the simplistic removal of wholly duplicate messages provides only a partial solution. On average, exactly duplicated messages constitute a small proportion of duplicated material. A much larger proportion of duplicated electronic messages are part of conversation threads that contain embedded information generated through a reply, forwarding, or attachment. The message containing the longest conversation thread is often the most pertinent message since each of the earlier messages are carried forward within the message itself. The messages comprising a conversation thread are "near" duplicate messages which can also be of interest in showing temporal and substantive relationships, as well as revealing potentially duplicated information.

In the prior art, electronic messaging applications provide limited tools for processing electronic messages. Electronic messaging clients, such as the Outlook product, licensed by Microsoft Corporation, Redmond, Wash., or the cc:mail product, licensed by Lotus Corporation, Cambridge, Mass., provide rudimentary facilities for sorting stored messages. However, these facilities are limited to processing only those messages stored in a single user account and are unable to handle multiple electronic message stores maintained by different message custodians.

Therefore, there is a need for an approach to processing electronic messages maintained in multiple message stores for document pre-analysis. Preferably, such an approach would generate a results log, including a point-to-point keyed collection and cross-reference keyed collection, and would "grade" the electronic messages into categories that include unique, exact duplicate, and near duplicate messages, as well as determine conversation thread length.

There is a further need for an approach to identifying unique messages and related duplicate and near-duplicate messages maintained in multiple message stores. Preferably, such an approach would include an ability to separate unique messages and to later reaggregate selected unique messages with their related duplicate and near duplicate messages as necessary.

There is a further need for an approach to processing electronic messages generated by Messaging Application Programming Interface (MAPI)-compliant applications.

SUMMARY OF THE INVENTION

The present invention provides a system and method for generating a shadow store storing messages selected from an aggregate collection of message stores. The shadow store can be used in a document review process. The shadow store is created by extracting selected information about messages from each of the individual message stores into a master array. The master array is processed to identify message topics which occur only once in the individual message stores and to then identify the related messages as unique. The remaining non-unique messages are processed topic by topic in a topic array from which duplicate, near-duplicate and unique messages are identified. In addition, thread counts are tallied. A log file indicating the nature and location of each message and the relationship of each message to other messages is generated. Substantially unique messages are copied into the shadow store for use in other processes, such as a document review process. Optionally, selected duplicate and near-duplicate messages are also copied into the shadow store or any other store containing the related unique message.

An embodiment of the present invention is a system and method for efficiently identifying unique messages stored in organized message stores. Duplicate messages containing substantially duplicative content are removed from topically identical messages logically extracted from a plurality of organized message stores. Near-duplicate messages containing content recursively included within another of the remaining messages are also removed. Unique messages including at least one of a message storing a single occurrence of a given topic and a message storing non-recursive content relative to each other such logically extracted message are stored.

A further embodiment of the present invention is a system and method for efficiently processing messages stored in multiple message stores. Metadata identifying a range of topically identical messages extracted from a plurality of message stores storing a multiplicity of messages to be processed is iteratively copied. The metadata for the extracted range of topically identical messages is categorized. For any topic range, if the number of topically identical messages is one, that message is identified as unique. If the number of topically identical messages is greater than one, those messages containing substantially duplicative content within the extracted range are identified as duplicate messages. Those non-duplicate messages within the extracted range are tallied into an ordering of conversation thread length. Those messages whose content is recursively-included content within another of the tallied non-duplicate messages are classified as near-duplicate messages. The remaining messages are designated as unique messages containing content that is not substantially duplicative of other messages.

A further embodiment of the present invention is a system and method for categorizing messages stored in message stores into discrete categories. Metadata for each message to be processed is extracted from a plurality of message stores. The metadata identifies the source message store and relative storage location for the message. The metadata is sorted according to topic. The content of messages with similar messages with identical topics are compared to identify and eliminate those messages containing substantially duplicative content. The remaining messages are sorted according to content by referencing the metadata and the metadata is ordered in order of conversation thread length. The content is compared to identify those messages whose content is recursively-included content within another of the messages. The remaining messages are identified by referencing the metadata as unique messages.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 shows, by way of example, an annotated electronic message.

DETAILED DESCRIPTION

Figure 1:
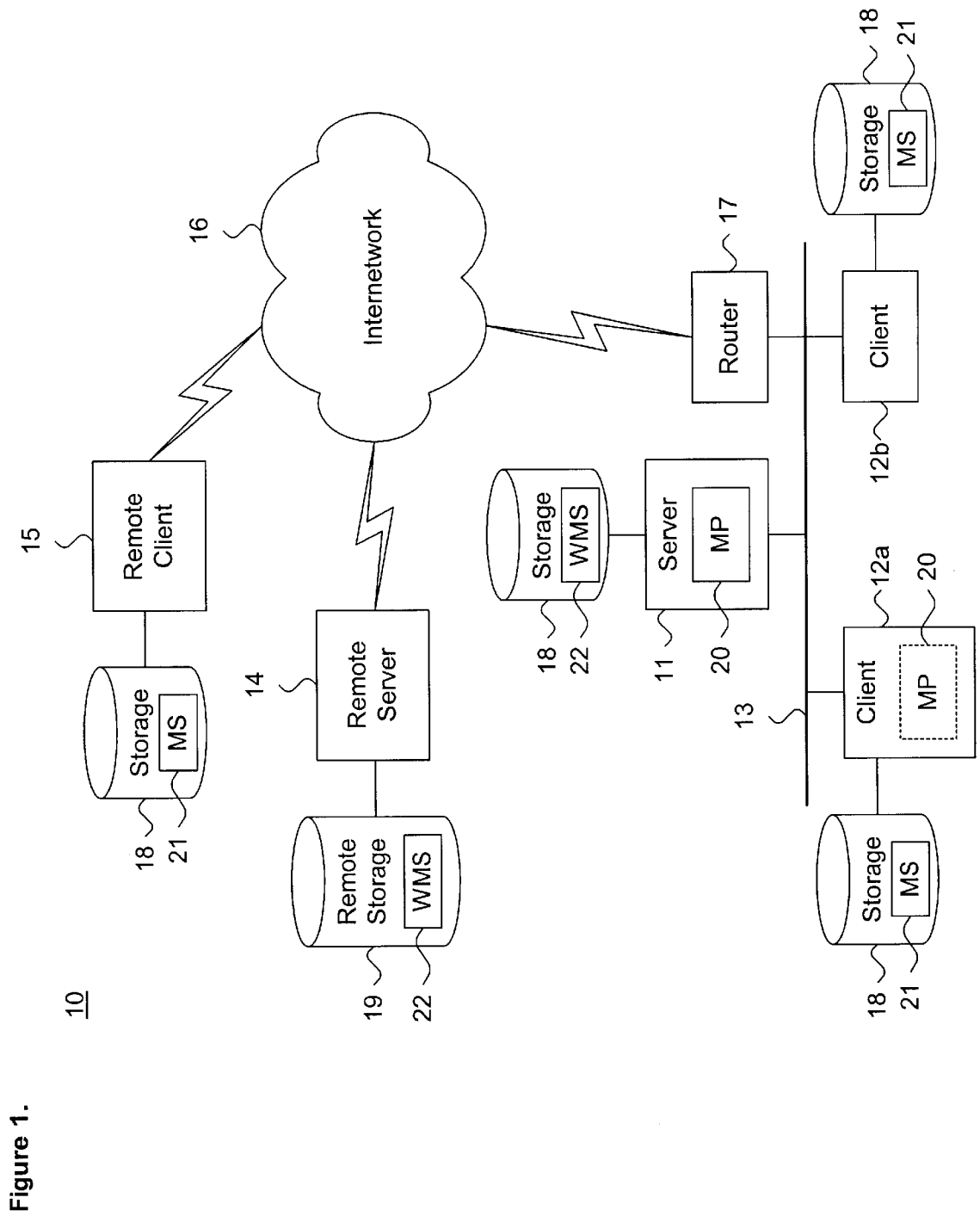
FIG. 1 is a functional block diagram showing a distributed computing environment, including a system for efficiently processing messages stored in multiple message stores, in accordance with the present invention.

FIG. 1 is a functional block diagram showing a distributed computing environment 10, including a system for efficiently processing messages stored in multiple message stores, in accordance with the present invention. The distributed computing environment 10 includes an internetwork 16, including the Internet, and an intranetwork 13. The internetwork 16 and intranetwork 13 are interconnected via a router 17 or similar interconnection device, as is known in the art. Other network topologies, configurations, and components are feasible, as would be recognized by one skilled in the art.

Electronic messages, particularly electronic mail (email), are exchanged between the various systems interconnected via the distributed computing environment 10. Throughout this document, the terms "electronic message" and "message" are used interchangeably with the same intended meaning. In addition, message types encompass electronic mail, scheduling, tasking, contact management, project management, workgroup activities, multimedia content, and other forms of electronically communicable objects, as would be recognized by one skilled in the art. These systems include a server 11 providing a message exchange service to a plurality of clients 12a, 12b interconnected via the intranetwork 13. The clients 12a, 12b can also subscribe to a remote message exchange service provided by a remote server 14 interconnected via the internetwork 16. Similarly, a remote client 15 can subscribe to either or both of the message exchange services from the server 11 and the remote server 14 via the internetwork 16.

Each of the systems is coupled to a storage device. The server 11, clients 12a, 12b, and remote client 15 each maintain stored data in a local storage device 18. The remote server 14 maintains stored data in a local storage device (not shown) and can also maintain stored data for remote systems in a remote storage device 19, that is, a storage device situated remotely relative to the server 11, clients 12a, 12b, and remote client 15. The storage devices include conventional hard drives, removable and fixed media, CD ROM and DVD drives, and all other forms of volatile and non-volatile storage devices.

Each of the systems also maintains a message store, either on the local storage device or remote storage device, in which electronic messages are stored or archived. Each message store constitutes an identifiable repository within which electronic messages are kept and can include an integral or separate archive message store for off-line storage. Internally, each message store can contain one or more message folders (not shown) containing groups of related messages, such as an "Inbox" message folder for incoming messages, an "Outbox" message folder for outgoing messages, and the like. For clarity of discussion, individual message folders will be treated alike, although one skilled in the art would recognize that contextually related message folders might be separately processed.

In a workgroup-computing environment, the server 11 collectively maintains the message stores as a workgroup message store (WMS) 22 for each subscribing client 12a, 12b and remote client 15. In a distributed computing environment, each client 12a, 12b and remote client 15 might maintain an individual message store 21 either in lieu of or in addition to a workgroup message store 21. Similarly, the remote server 14 could maintain a workgroup message store 22 for remote clients.

Over time, each of the message stores unavoidably accumulates duplicates, at least in part, of other electronic messages stored in the message store for the same user or for other users. These duplicate and near-duplicate electronic messages must be identified and removed during document pre-analysis. Thus, the server 11 includes a message processor 20 for efficiently processing the electronic messages stored in the various message stores 21, 22 as further described below beginning with reference to FIG. 2. Optionally, an individual client 12a could also include the message processor 20. The actual homing of the message processor 20 is only limited by physical resource availability required to store and process individual message stores 21 and workgroup message stores 22.

The electronic messages are retrieved directly from the individual message stores 21, the workgroup message stores 22, or consolidated from these message stores into a combined message store. For document pre-analysis, the message stores can include both active "on-line" messages and archived "off-line" messages maintained in a local storage device 18 or remote storage device 19.

The individual computer systems including the server 11, clients 12, remote server 14, and remote client 15, are general purpose, programmed digital computing devices consisting of a central processing unit (CPU), random access memory (RAM), non-volatile secondary storage, such as a hard drive, CD ROM or DVD drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
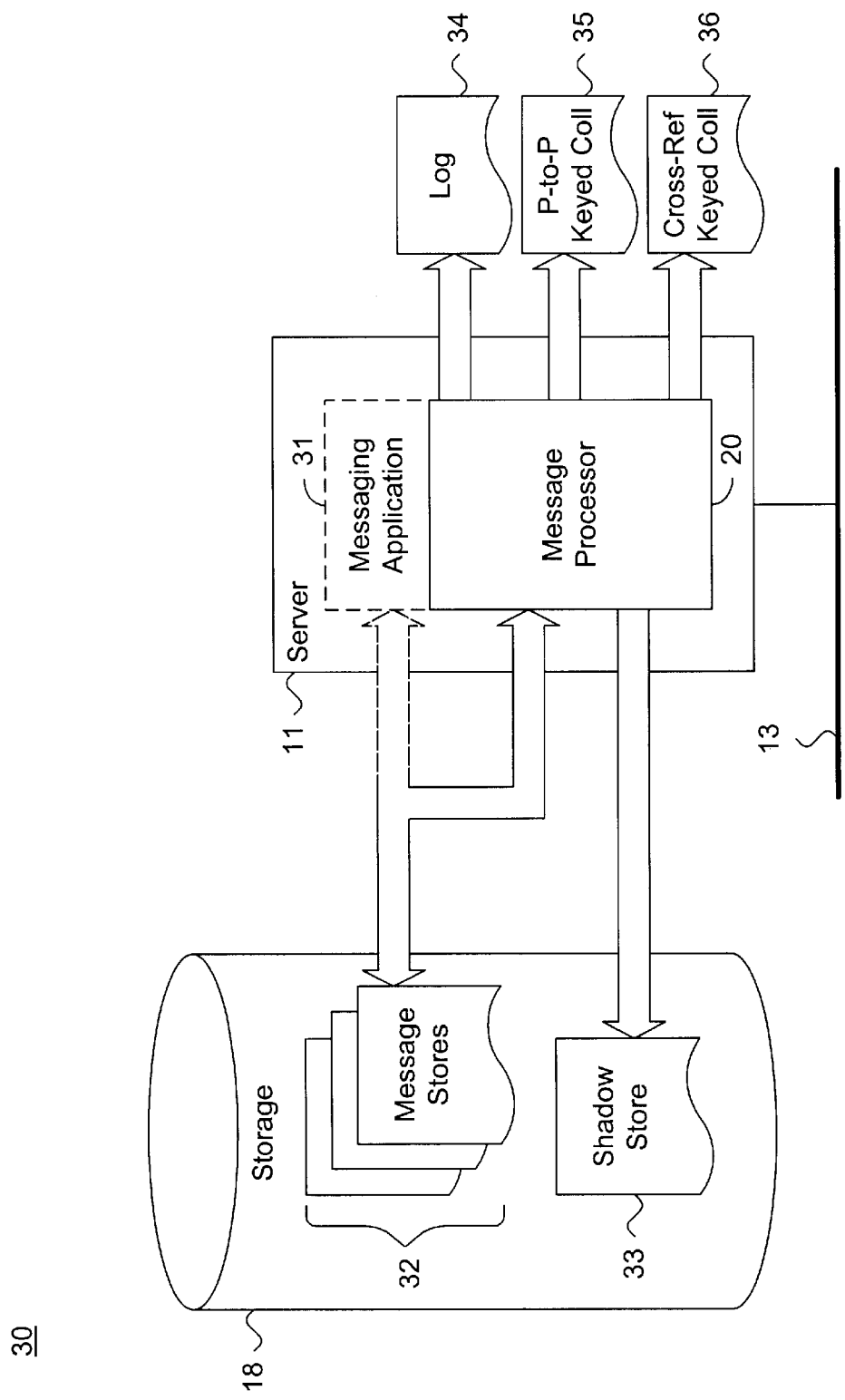
FIG. 2 is a block diagram showing the system for efficiently processing messages of FIG. 1.

FIG. 2 is a block diagram showing the system for efficiently processing messages of FIG. 1. The system 30 includes the server 11, storage device 18, and one or more message stores 32. The message stores 32 could include individual message stores 21 and workgroup message stores 22 (shown in FIG. 1). Alternatively, the system 30 could include a client 12a (not shown) instead of the server 11.

The server 11 includes the messages processor 20 and optionally operates a messaging application 31. The messaging application 31 provides services with respect to electronic message exchange and information storage to individual clients 12a, 12b, remote servers 14, and remote clients 15 (shown in FIG. 1). On an application side, these services include providing electronic mail, scheduling, tasking, contact and project management, and related automated workgroup activities support. On a system side, these services include message addressing storage and exchange, and interfacing to low-level electronic messaging subsystems. An example of a message exchange server 31 is the Exchange Server product, licensed by Microsoft Corporation, Redmond, Wash. Preferably, the message exchange server 31 incorporates a Messaging Application Programming Interface (MAPI)-compliant architecture, such as described in R. Orfali et al., "Client/Server Survival Guide," Ch. 19, John Wiley & Sons, Inc. (1999 3d ed.), the disclosure of which is incorporated by reference. The messaging application is not a part of the present invention, but is shown to illustrate a suitable environment in which the invention may operate.

The message processor 20 processes the message stores 32 (shown in FIG. 1) to efficiently pre-analyze the electronic messages, as further described below with reference to FIG. 3. The message stores 32 are processed to create one or more constructs stored into a "shadow" store 33. A point-to-point keyed collection 35 stores cross-references between the identifier of the original message store 32 or folder in the original message store and the identifier of the newly created corresponding folder or subfolder in the shadow store 33. During processing, the electronic messages are "graded" into duplicate, near-duplicate and unique categories and tagged by longest conversation thread.

The results of message processing are chronicled into a log 34 to identify unique messages 44 and to create a processing audit trail for allowing the source and ultimate disposition of any given message to be readily traced. As well, a cross-reference keyed collection 36 allows unique message identifiers to be submitted and the source location information of those messages that are duplicates or near-duplicates of the unique message to be retrieved. The retrieval information allows the optional reaggregation of selected unique messages and the related duplicate and near-duplicates messages at a later time, such as by inclusion into the shadow store 33 at the end of the document review process. Optionally, the duplicate and near-duplicate messages can be rejoined with their related unique messages for completeness. The log 34 records not only the disposition of each message, but, in the case of duplicate and near-duplicate messages, indicates the unique message with which each duplicate and near-duplicate message is associated, thereby permitting specific duplicate and near-duplicate messages to be located and optionally reaggregated with selected unique messages at a later time. In the described embodiment, the cross-reference keyed collection 36 is maintained as part of the log 34, but is separately identified for purposes of clarity. The unique messages 44 are copied into the shadow store 33 for forwarding to the next stage of document review.

Figure 3:
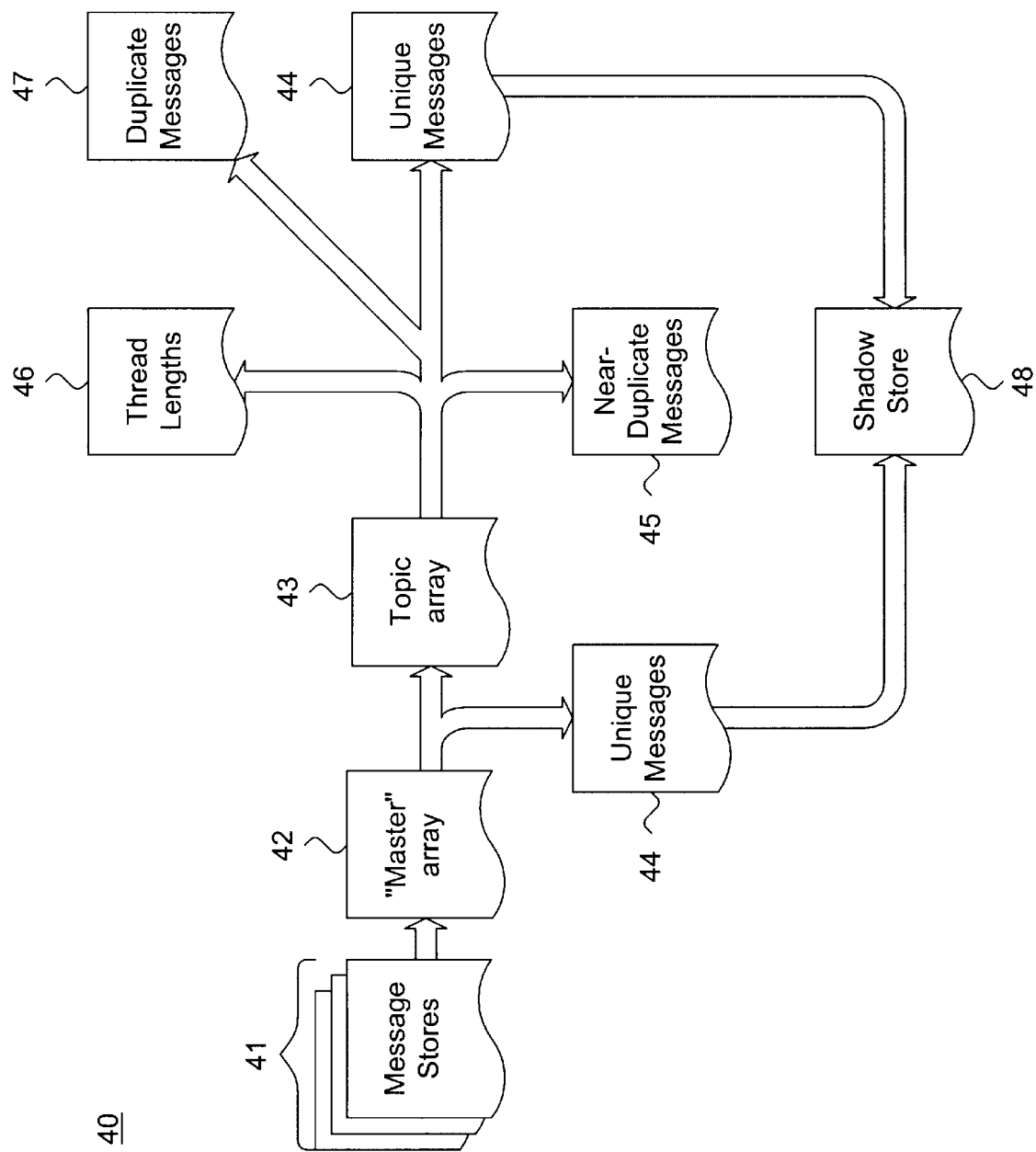
FIG. 3 is a data flow diagram showing the electronic message processing followed by the system of FIG. 2.

FIG. 3 is a data flow diagram 40 showing the electronic message processing cycle followed by the system 30 of FIG. 2. First, the various message stores 41 are opened for access. Metadata consisting of message identification information, including message source location information, and message topics (or subjects), is extracted into a "master" array 42. The master array 42 is a logical collection of the topics and identification information, in the form of metadata, for all of the messages in the various message stores 41. The metadata is manipulated in the various data structures described herein, including the master array 42, topic array 43, and arrays for unique messages 44, near-duplicate messages 45, thread lengths 46, and duplicate messages 47. However, except as noted otherwise, the messages are described as being directly manipulated during processing, although one skilled in the art would recognize that metadata, messages, or any combination thereof could be used.

The messages in the master array 42 are sorted by topic to identify unique messages and conversation threads, as reflected by ranges of multiple occurrences of the same topic. The identification information (metadata) for those messages having identical topics is extracted into a topic array 43 as each new topic is encountered within the master array 42.

The topic array 43 functions as a working array within which topically identical messages are processed. The identification information extracted from the master array 42 is used to copy into the topic array further information from messages sharing a common topic, including their plaintext. At any point in processing, the topic array 43 contains only those messages sharing a common topic. These topically identical messages are sorted by plaintext body and analyzed. Duplicate messages 47, containing substantially duplicated content, are removed from the topic array 43. The remaining non-duplicate messages in the topic array 43 are searched for thread markers indicating recursively-included content and conversation thread lengths 46 are tallied. The messages in the topic array 43 are compared and near-duplicate messages 45 are identified. The unique messages 45 are marked for transfer into the shadow store 48.

Figure 4:
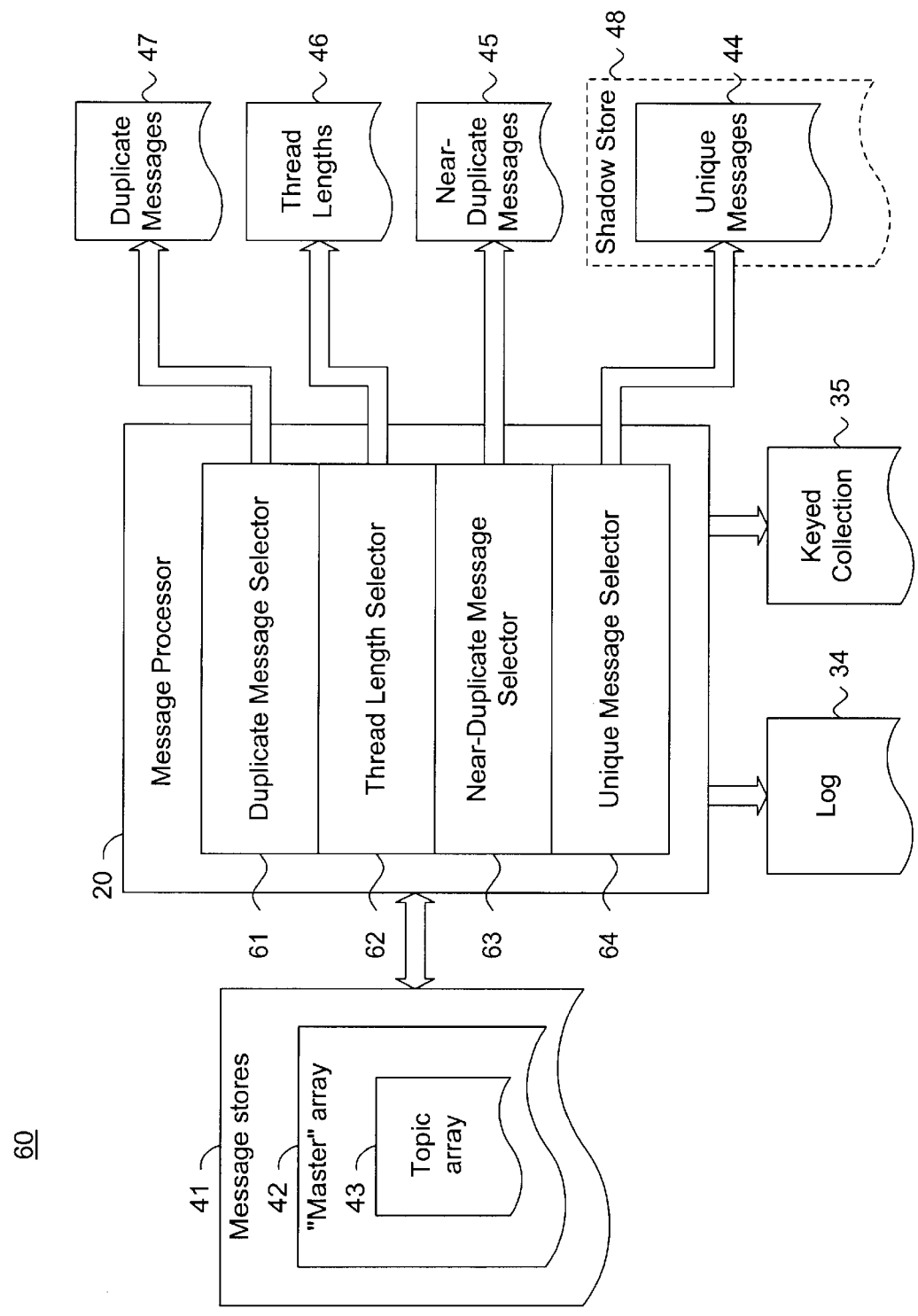
FIG. 4 is a block diagram showing the software modules of the system of FIG. 2.

FIG. 4 is a block diagram showing the software modules 60 of the system 30 of FIG. 2. Each module is a computer program, procedure or module written as source code in a conventional programming language, such as the Visual Basic programming language, and is presented for execution by the CPU as object or byte code, as is known in the art. The various implementations of the source code and object and byte codes can be held on a computer-readable storage medium or embodied on a transmission medium in a carrier wave. The message processor 20 operates in accordance with a sequence of process steps, as further described below beginning with reference to FIG. 6.

The message processor 20 includes four primary modules: duplicate message selector 61, thread length selector 62, near-duplicate message selector 63, and unique message selector 64. Prior to processing, the message stores 41 are logically consolidated into the master array 42. At each stage of message processing, a log entry is created (or an existing entry modified) in a log 34 to track messages and record message identification information. The duplicate message selector 61 identifies and removes those duplicate messages 47 containing substantially duplicative content from the topic array 43. The thread length selector 62 tallies the conversation thread lengths 46 and maintains an ordering of thread lengths, preferably from shortest to longest conversation thread length. The near-duplicate message selector 63 designates as near-duplicate messages 45 those whose content is recursively-included in other messages, such as those messages generated through a reply or forwarding sequence, or as an attachment. The unique message selector 64 designates as unique messages 45 those messages that have been extracted out of the master array 42 as not being topically identical and those messages remaining after the duplicate messages 48 and near-duplicate messages 46 have been identified. The unique messages 45 are forwarded to the shadow store 48 for use in subsequent document review. The unique, near-duplicate, and duplicate messages, as well as thread counts, are regularly recorded into the log 34, as the nature of each message is determined. As well, the location information permitting subsequent retrieval of each near-duplicate message 45 and duplicate message 47 is regularly inserted into the cross-reference keyed collection 36 relating the message to a unique message as the relationship is determined.

FIG. 5 shows, by way of example, an annotated electronic message 70. Often the message having the longest conversation thread length 47 is the most useful message to review. Each preceding message is recursively included within the message having the longest conversation thread length and therefore these near-duplicate messages can be skipped in an efficient review process.

The example message 70 includes two recursively-included messages: an original e-mail message 71 and a reply e-mail message 72. The original e-mail message 71 was sent from a first user, user1@aol.com, to a second user, user2@aol.com. In reply to the original e-mail message 71, the second user, user2@aol.com, generated the reply e-mail message 72, sent back to the first user, user1@aol.com. Finally, the first user, user1@aol.com, forwarded the reply e-mail message 72, which also included the original e-mail message 71, as a forwarded e-mail message 73, to a third user, user3@aol.com.

Each of the e-mail messages 71, 72, 73 respectively includes a message body (recursively-included) 74, 78, 82 and a message header 75, 77, 81. The original e-mail message 71 and the reply e-mail message 72 are recursively-included messages. The original e-mail message 71 is recursively included in both the reply e-mail message 72 and forwarded e-mail message 73 while the reply e-mail message 72 is recursively included only in the forwarded e-mail message 73.

Each successive reply, forwarding or similar operation increases the conversation thread length 47 of the message. Thread lengths 47 are indicated within the messages themselves by some form of delimiter. In the example shown, the inclusion of the original e-mail message 71 in the reply e-mail message 72 is delimited by both a separator 80 and a "RE:" indicator in the subject line 79. Likewise, the inclusion of the reply e-mail message 72 is delimited by a separator 84 and a "FW:" indicator in the subject line 83. The message separators 80, 84 and subject line indicators 79, 83 constitute thread "markers" that can be searched, identified and analyzed by the message processor 20 in determining thread lengths 47 and near-duplicate messages 46.

Figure 6:
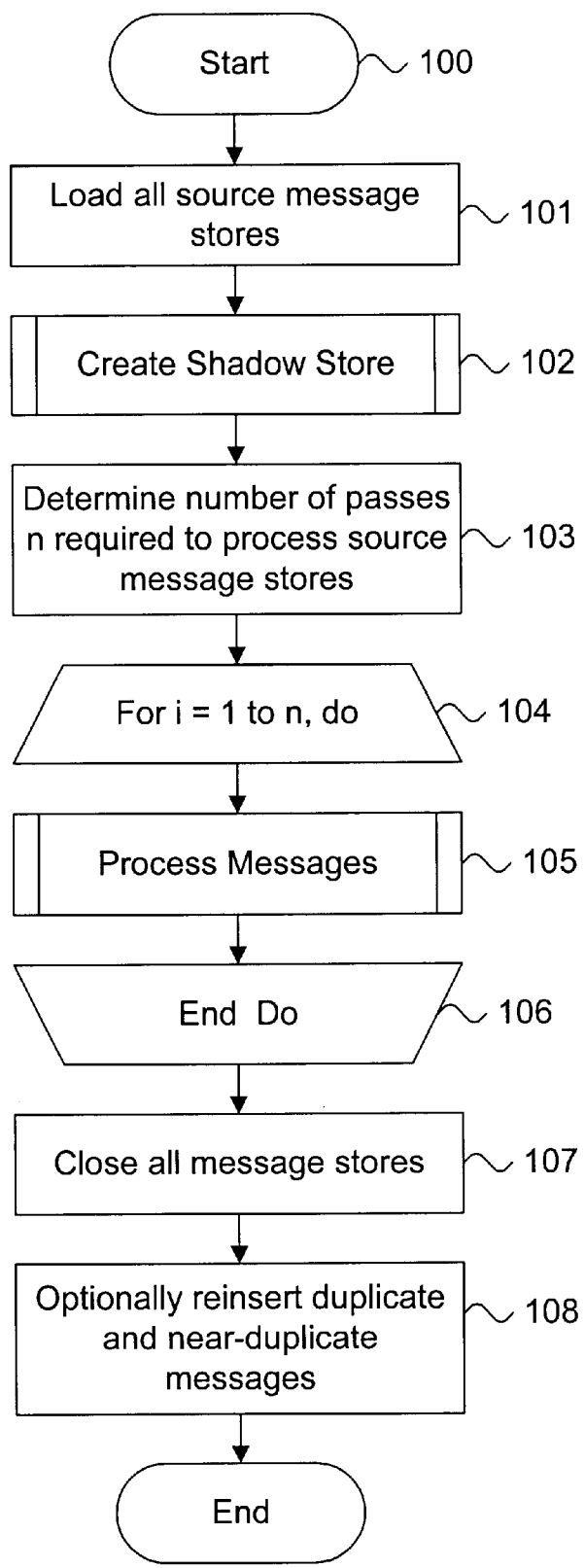
FIG. 6 is a flow diagram showing a method for efficiently processing messages stored in multiple message stores, in accordance with the present invention.

FIG. 6 is a flow diagram showing a method 100 for efficiently processing messages stored in multiple message stores, in accordance with the present invention. The method 100 operates in two phases: initialization (blocks 101–103) and processing (blocks 104–107).

During initialization, the message stores 41 (shown in FIG. 3) are opened for access by the message processor 20 (block 101) and the shadow store 48 is created (block 102), as further described below with reference to FIG. 7. In the described embodiment, the message processor 20 has a finite program capacity presenting an upper bound on the maximum number of electronic messages to be processed during a single run. Consequently, multiple processing passes may be required to process all of the messages stored in the aggregate of the message stores 41.

Assuming that the aggregate number of messages exceeds the program bounds, the processing is broken down into a series of passes n, during each of which a portion of the aggregate message stores 41 is processed. The number of passes n required to process the source message stores 41 is determined (block 103) by the following equation:

$$n = ceil\left(\frac{TotNumMessages}{ProgMax}\right)$$

where n equals the total number of iterative passes, TotNumMessages is the total number of messages in the aggregate of the message stores 41, and ProgMax is the maximum program message processing capacity.

In the described embodiment, the aggregate selection of messages from the message stores 41 is processed by overlapping partition i, preferably labeled by dividing the alphabet into partitions corresponding to the number of passes n. For example, if two passes n are required, the partitions would be "less than M" and "greater than L." Similarly, if 52 passes n were required, the partitions would be "less than Am" and "greater than Al and less than Ba."

During operation, the partitions, if required, are processed in an iterative processing loop (blocks 104–106). During each pass n (block 104) the messages are processed (block 105), as further described below beginning with reference to FIG. 8. Upon the completion of the processing (block 106), the message stores 41 are closed (block 107). As an optional operation, the duplicate messages 47 and the near-duplicates messages 45 are reinserted into the shadow store 48 (block 108). The method terminates upon the completion of processing.

Figure 7:
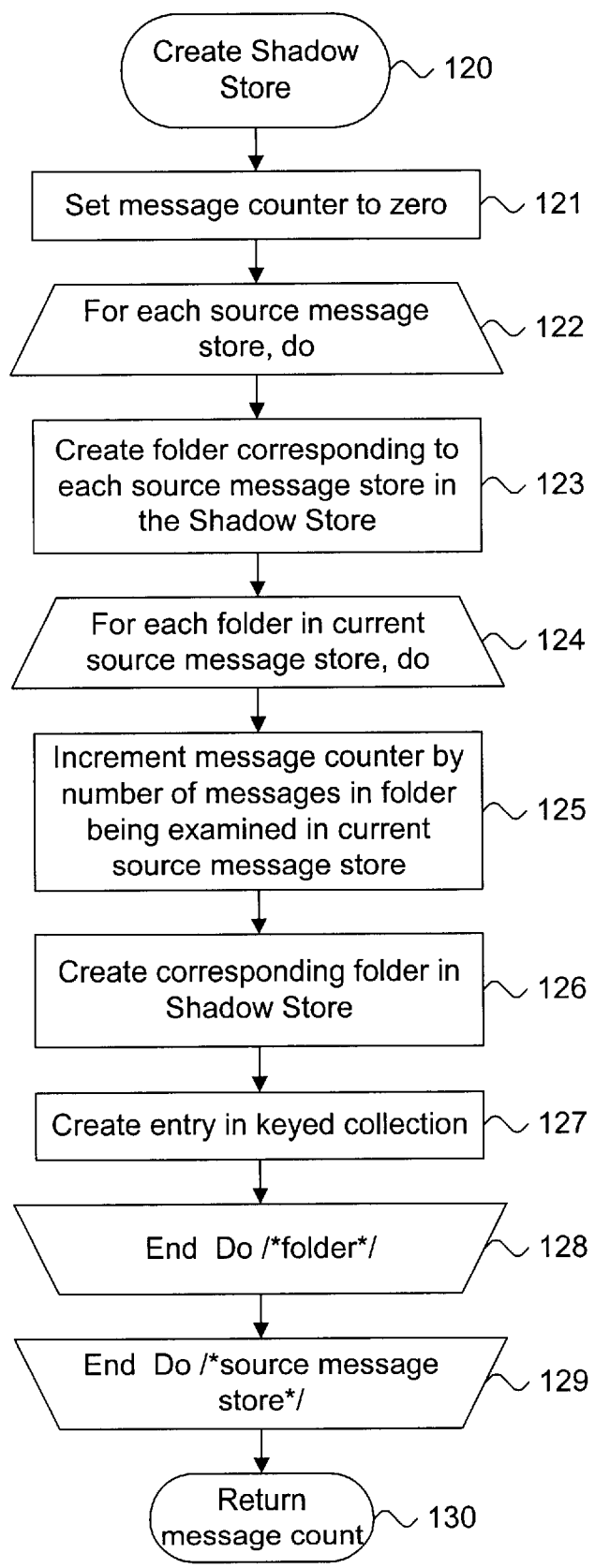
FIG. 7 is a flow diagram showing the routine for creating a shadow store for use in the method of FIG. 6.

FIG. 7 is a flow diagram showing the routine 120 for creating a shadow store for use in the method 100 of FIG. 6. The purpose of this routine is to create a holding area, called the shadow store 48 (shown in FIG. 3) in which unique messages 45 are stored for the next stage in document review. A message counter is maintained to count the messages in the aggregate of all message stores 41. The message counter is initially set to zero (block 121). Each of the source message stores 41 is then processed in a pair of nested iterative processing loops (blocks 122–128 and 124–129), as follows.

During the outer processing loop (blocks 122–129), a folder corresponding to each source message store 41 is created in the shadow store 48 (block 123). Next, each of the folders in the current selected source message store 41 is iteratively processed in the inner processing loop (blocks 124–128) as follows. First, the message counter is incremented by the number of messages in the folder being examined in the source message store 41 (block 125) and a corresponding folder in the shadow store 48 is created (block 126). An entry is made in a point-to-point keyed collection 35 (block 127) that constitutes a cross-reference between a pointer to the original message store 41 or folder in the original message store and a pointer to the newly created corresponding folder or subfolder in the shadow store 48. When unique messages are later copied into the shadow store 48, this keyed file allows the copying to proceed "point-to-point," rather than requiring that the folders in the shadow store 48 be iteratively searched to find the correct one. Processing of each folder in the current source message store 41 continues (block 128) for each remaining folder in the source message store. Similarly, processing of each of the source message stores themselves 41 continues (block 129) for each remaining source message store 41, after which the routine returns (block 130), providing a count of all the messages in all the source message stores so that the number of passes required can be determined.

Figure 8:
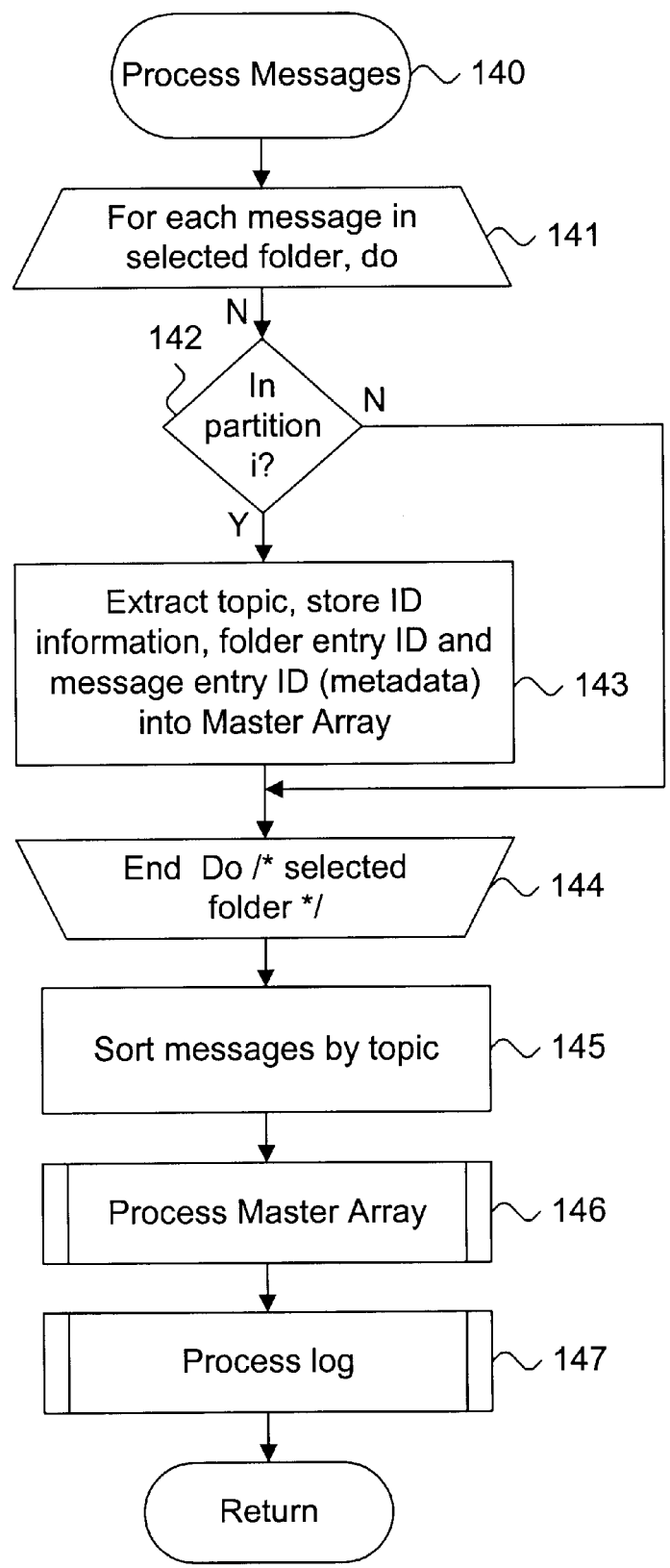
FIG. 8 is a flow diagram showing the routine for processing messages for use in the method of FIG. 6.

FIG. 8 is a flow diagram showing the routine 140 for processing messages for use in the method 100 of FIG. 6. The purpose of this routine is to preprocess the messages stored in the message stores 41. Note at each stage of message processing, a log entry is implicitly entered into the log 34 (shown in FIG. 3) to record the categorization and disposition of each message.

The messages are processed in a processing loop (blocks 141–144). During each iteration (block 141), each message in the selected folder is checked for membership in the current partition i of the source message stores 41 (block 142). If the message is in the current partition i (block 142), the message is logically transferred into the master array 42 (block 143) by extracting the topic and location information, including message identification information and pointers to the source message store 41, the source message folder, and to the individual message (metadata). Using metadata, rather than copying entire messages, conserves storage and memory space and facilitates faster processing. Processing continues for each message in the selected folder (block 144).

When all folders have been processed and the metadata for those messages found to be within the partition has been transferred into the master array, message processing begins. The messages are sorted by topic (block 145) and the master array 42 is processed (block 146), as further described below with reference to FIG. 9. Last, the log 49 is processed (block 147), after which the routine returns.

Figure 9:
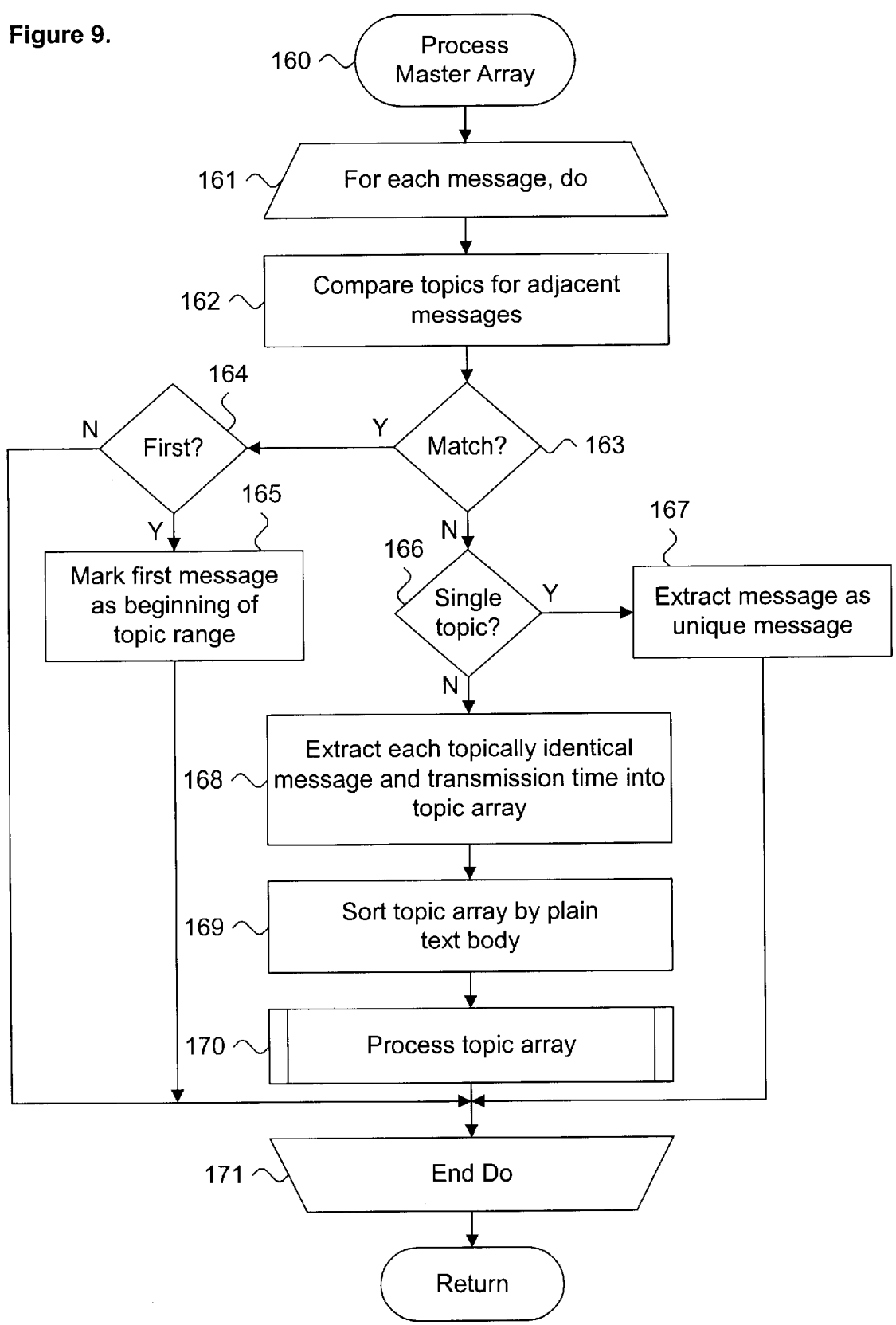
FIG. 9 is a flow diagram showing the routine for processing the master array for use in the routine of FIG. 8.

FIG. 9 is a flow diagram showing the routine 160 for processing the master array 42 for use in the routine 140 of FIG. 8. The purpose of this routine is to identify unique messages 44 and to process topically identical messages using the topic array 43. The routine processes the messages to identify unique and topically similar messages using an iterative processing loop (blocks 161–171). During each iteration (block 161), the topic (or subject line) of the each message in the master array 42 is compared to that of the next message in the master array 42 (block 162). If the topics match (block 163), the messages may be from the same conversation thread. If the message is the first message with the current topic to match the following message (block 164), this first message in the potential thread is marked as the beginning of a topic range (block 165) and processing continues with the next message (block 171). Otherwise, if the message is not the first message in the conversation thread (block 164), the message is skipped and processing continues with the next message (block 171).

If the topics do not match (block 163), the preceding topic range is ending and a new topic range is starting. If the current message was not the first message with that topic (block 166), the range of messages with the same topic (which began with the message marked at block 165) is processed (block 168). If the current message is the first message with the matching topic (block 166), the message is extracted as a unique message 45 (block 167) and processing continues with the next message (block 171). If the topic range has ended (block 166), each topically identical message, plus message transmission time, is logically extracted into the topic array 43 (block 168). In the described embodiment, the messages are not physically copied into the topic array 43; rather, each message is logically "transferred" using metadata into the topic array 43 to provide message source location information, which is used to add a copy of the plaintext body of the message into the topic array. The topic array 43 is sorted by plaintext body (block 169) and processed (block 170), as further described below with reference to FIGS. 10A–C. Processing continues with the next message (block 171). The routine returns upon the processing of the last message in the master array 42.

Figure 10A:
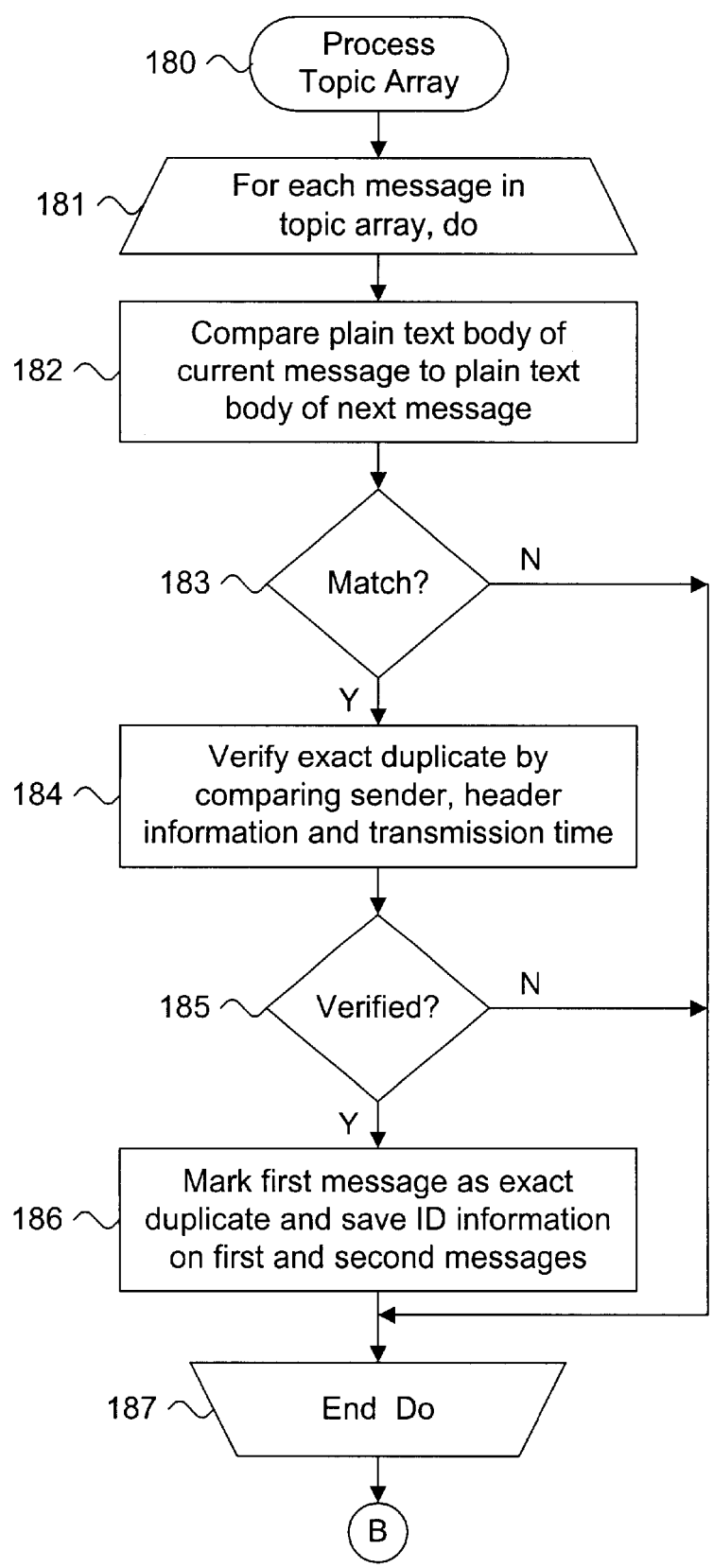
FIGS. 10A–C are flow diagrams showing the routine for processing a topic array for use in the routine of FIG. 9.
Figure 10B:
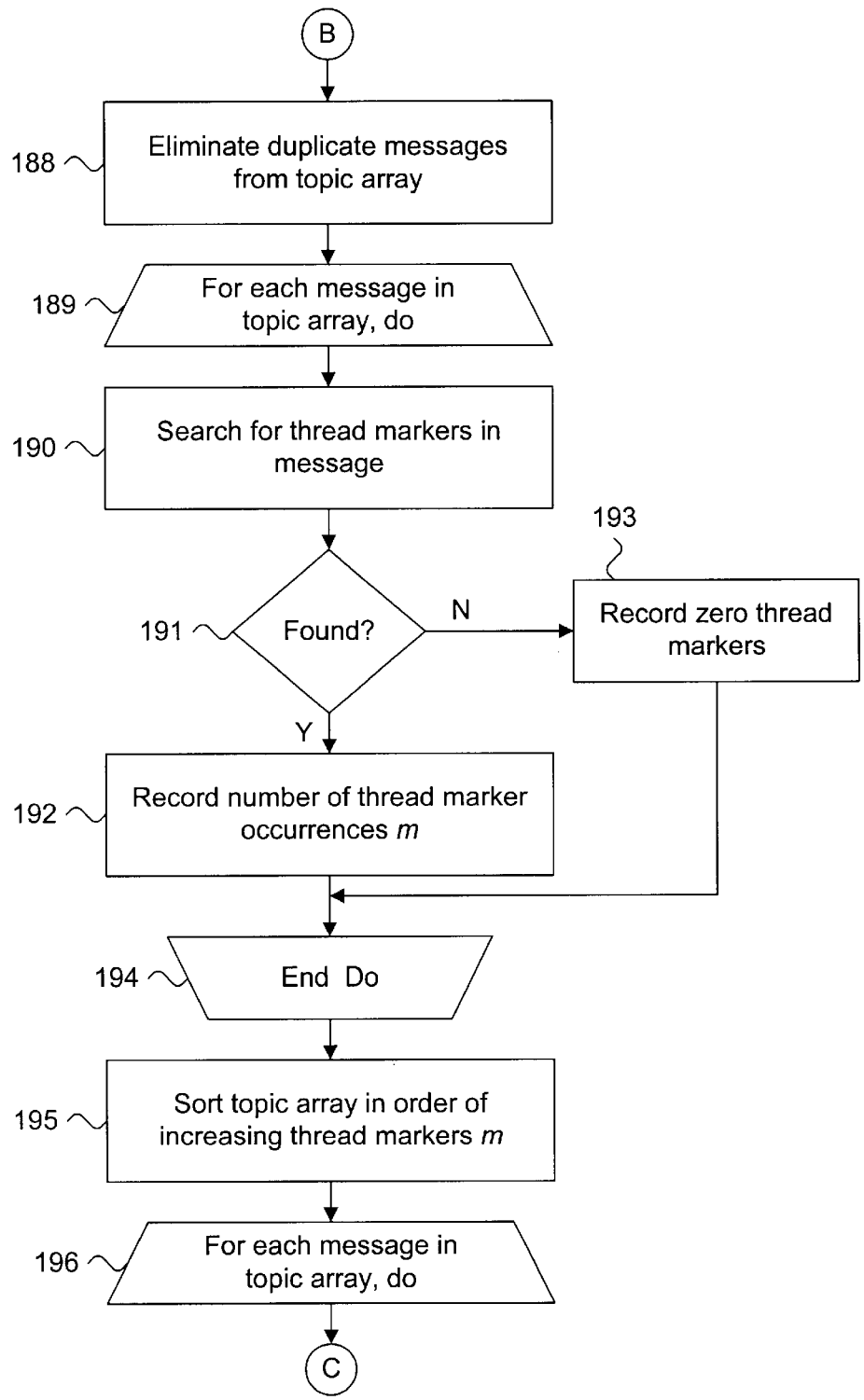
Figure 10C:
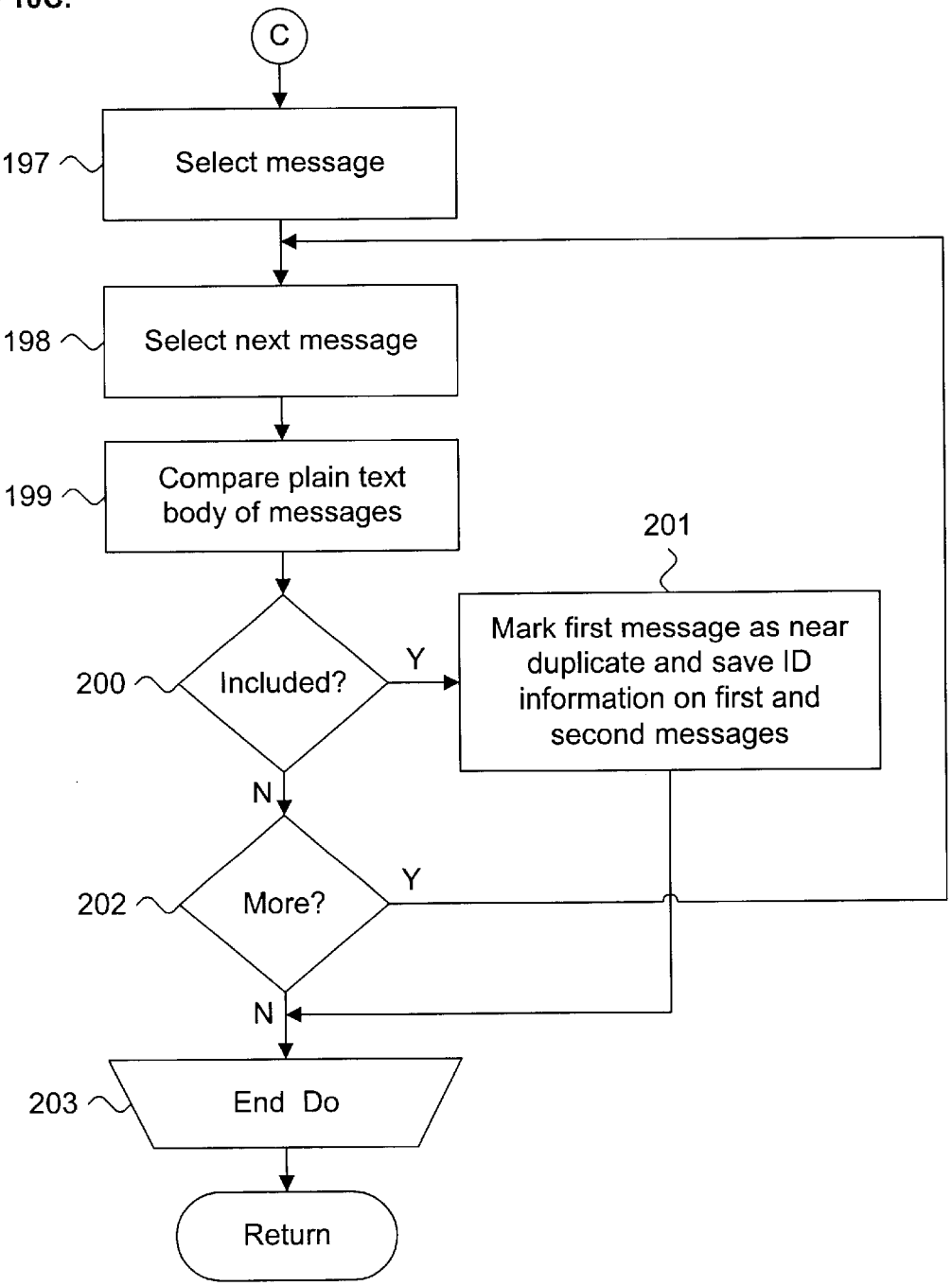

FIGS. 10A–C are flow diagrams showing the routine 180 for processing a topic array for use in the routine 160 of FIG. 9. The purpose of this routine is to complete the processing of the messages, including identifying duplicate, near-duplicate and unique messages, and counting thread lengths. The routine cycles through the topic array 43 (shown in FIG. 3) in three iterative processing loops (blocks 181–187, 189–194 and 196–203) as follows.

During the first processing loop (blocks 181–187) each message in the topic array 43 is examined. The plaintext body of the current message is compared to the plaintext body of the next message (block 182). If the plaintext bodies match (block 183), an exact duplicate message possibly exists, pending verification. The candidate exact duplicate is verified by comparing the header information 75, 77, 81 (shown in FIG. 5), the sender of the message (block 184), and the transmission times of each message. If the match is verified (block 185), the first message is marked as an exact duplicate of the second message and the identification information for the first and second messages and their relationship is saved into the log 49 (block 186) and cross-reference keyed collection 36 (shown in FIG. 2). The processing of each subsequent message in the topic array 43 (block 187) continues for the remaining messages.

Next, the messages marked as duplicate messages are removed from the topic array 43 (block 188) and the remaining non-duplicate messages in the topic array 43 are processed in the second processing loop (blocks 189–194) as follows. First, each message is searched for thread markers, including separators 80, 84 and subject line indicators 79–83 (shown in FIG. 5) (block 190). If thread markers are found (block 191), the number of thread marker occurrences m is counted and recorded (block 192). Otherwise, the message is recorded as having zero thread markers (block 193). In the described embodiment, the data entries having zero thread markers are included in the sorting operations. These messages have message content, but do not include other messages. Recording zero thread markers allows these "first-in-time" messages to be compared against messages which do have included messages. Processing continues for each of the remaining messages (block 194), until all remaining messages in the topic array 43 have been processed.

The topic array is next sorted in order of increasing thread markers m (block 195) and the messages remaining in the topic array 43 are iteratively processed in the third processing loop (block 196–203). During each processing loop (block 196), the first and subsequent messages are selected (blocks 197, 198) and the plaintext body of the messages compared (block 199). In the described embodiment, a text comparison function is utilized to allow large text blocks to be efficiently compared. If the plaintext body of the first selected message is included in the plaintext body of the second selected message (block 200), the first message is marked as a near-duplicate of the second message and identification information on the first and second messages and their relationship is saved into the log 49 and cross-reference keyed collection 36 (shown in FIG. 2) (block 201). If the plaintext body of the first selected message is not included in the plaintext body of the second selected message and additional messages occur subsequent to the second message in the topic array 43 (block 202), the next message is selected and compared as before (blocks 198–202). Each subsequent message in the topic array is processed (block 203) until all remaining messages have been processed, after which the routine returns.

Figure 11:
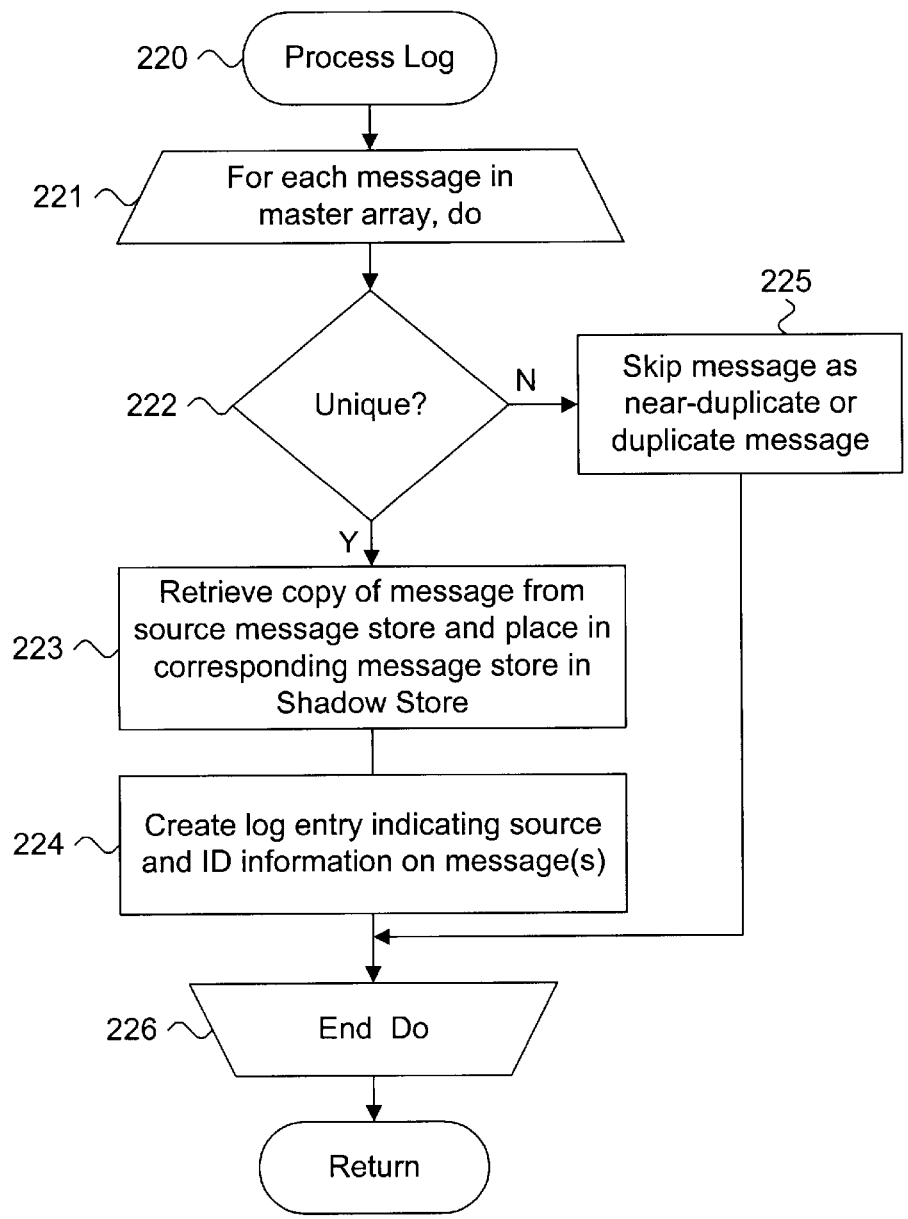
FIG. 11 is a flow diagram showing the routine for processing a log for use in the routine of FIG. 8.

FIG. 11 is a flow diagram showing the routine 220 for processing a log for use in the routine 140 of FIG. 8. The purpose of this routine is to finalize the log 34 for use in the review process. Processing occurs in an iterative processing loop (block 221–226) as follows. Each message in the master array 42 is processed during each loop (block 221). If the selected message is a unique message 45 (block 222), a copy of the message is retrieved from the source folder in the source message store 41 (shown in FIG. 3) and placed into the corresponding folder in the corresponding message store in the shadow store 48 (block 223) (using the cross-reference keyed collection 36 created at the time of creating the shadow store 34), plus an entry with message source location information and identification information is created in the log 34 (block 224). Otherwise, the message is skipped as a near-duplicate message 45 or duplicate message 47 (block 225) that is not forwarded into the next phase of the document review process. Processing of each subsequent message in the master array 42 continues (block 226) for all remaining messages, after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for efficiently identifying unique email messages stored in organized email message stores, comprising:
   a duplicate email message selector removing duplicate email messages containing substantially duplicative content from topically identical email messages logically extracted from a plurality of organized email message stores;
   a near-duplicate email message selector removing near-duplicate email messages containing content recursively included within another of the remaining email messages;
   a unique email message selector storing unique email messages comprising at least one of a email message storing a single occurrence of a given topic and a email message storing non-recursive content relative to each other such logically extracted email message and storing the unique email messages in a location within a store corresponding to a location within the organized email message stores from which each unique email message originated;
   a log identifying the relative source location of each unique email message and cross referencing any of the duplicate email messages and near-duplicate email messages relating thereto; and
   a cross-reference keyed collection identifying the relative source location of each unique email message and any of the duplicate email message and near-duplicate email messages relating thereto.

2. A system according to claim 1, further comprising:
   a thread length selector sorting the email messages remaining after the duplicate email messages are removed in order of conversation thread length.

3. A system according to claim 1, further comprising:
   a email message processor extracting metadata identifying a relative source location for each email message within the organized email message stores; and
   the near-duplicate email message selector and the near-duplicate email message selector processing the metadata during removal of the duplicate email messages and the near-duplicate email messages.

4. A system according to claim 1, further comprising:
the duplicate email message selector and the near-duplicate email message selector storing the duplicate email messages and the near-duplicate email messages for at least one unique email message into the store by identifying each duplicate email message and the near-duplicate email message using the cross-reference keyed collection.

5. A method for efficiently identifying unique email messages stored in organized email message stores, comprising:
removing duplicate email messages containing duplicative content from topically identical email messages logically extracted from a plurality of organized email message stores as extracted email messages;
removing near-duplicate email messages containing content recursively included within another of the remaining email messages;
storing unique email messages comprising at least one of a email message storing a single occurrence of a given topic and an email message storing non-recursive content relative to each other such logically extracted email message;
storing the unique email messages in a location within a store corresponding to a location within the organized email message stores from which each unique email message originated;
maintaining a log identifying the relative source location of each unique email message and cross referencing any of the duplicate email messages and near-duplicate email messages relating thereto; and
maintaining a cross-reference keyed collection identifying the relative source location of each unique email message and any of the duplicate email message and near-duplicate email messages relating thereto.

6. A method according to claim 5, further comprising:
sorting the email messages remaining after the duplicate email messages are removed in order of conversation thread length.

7. A method according to claim 5, further comprising:
extracting metadata identifying a relative source location for each email message within the organized email message stores; and
processing the metadata during removal of the duplicate email messages and the near-duplicate email messages.

8. A method according to claim 5, further comprising:
storing the duplicate email messages and the near-duplicate email messages for at least one unique email message into the store by identifying each duplicate email message and the near-duplicate email message using the cross-reference keyed collection.

9. A computer-readable storage medium holding code for performing the method of claim 5.

10. A system for efficiently processing email messages stored in multiple email message stores, comprising:
an email message processor iteratively copying metadata identifying a range of topically identical email messages extracted from a plurality of email message stores storing a multiplicity of email messages to be processed and categorizing the metadata for the extracted range of topically identical email messages, the email message process further comprising:
a duplicate email message selector identifying those email messages containing duplicative content within the extracted range as duplicate email messages;
a thread length selector tallying those non-duplicate email messages within the extracted range into an ordering of conversation thread length;
a near-duplicate email message selector classifying those email messages whose content is recursively-included content within another of the tallied non-duplicate email messages as near-duplicate email messages;
a unique email message selector designating the remaining email messages as unique email messages containing substantially non-duplicative content;
a store storing the unique email messages and comprising a plurality of relative stores and folders corresponding to the email message stores from which each unique email message originated;
a log comprising an entry for each of the unique email messages, each log entry storing email message source location information and identification information for any such duplicate email message and near-duplicate email message related thereto; and
a cross-reference keyed collection comprising an entry for each of the duplicate email message and the near-duplicate email messages keyed to identification information for one such unique email message associated therewith.

11. A system according to claim 10, further comprising:
the email message processor extracting the metadata for the email messages to be processed from the email message stores and sorting the metadata according to topic 12. A system according to claim 11, further comprising:
the duplicate message selector sorting the metadata for the extracted range of topically identical email messages according to content prior to identifying the duplicate email messages.

13. A system according to claim 10, further comprising:
the thread length selector sorting the metadata for the non-duplicate email messages by content prior to tallying the non-duplicate email messages.

14. A system according to claim 10, further comprising:
the duplicate email message selector verifying the duplicate email messages by comparing indicia in addition to the content stored therein.

15. A system according to claim 14, wherein the indicia comprises header information, further comprising:
the duplicate email message selector comparing the header information stored with each of the duplicate email messages.

16. A system according to claim 10, further comprising:
the thread length selector determining each conversation thread length based on thread markers comprising at least one of keywords, delimiter strings, and relative location within each email message.

17. A system according to claim 10, further comprising:
the store storing the duplicate email messages and the near-duplicate email messages copied thereto by identifying the associated unique email message with the cross-reference keyed collection.

18. A system according to claim 10, wherein each email message store comprises a MAPI-compliant email message store.

19. A method for efficiently processing email messages stored in multiple email message stores, comprising:
iteratively copying metadata identifying a range of topically identical email messages extracted from a plurality of email message stores storing a multiplicity of email messages to be processed; and categorizing the metadata for the extracted range of topically identical email messages, comprising:

identifying those email messages containing duplicative content within the extracted range as duplicate email messages;

tallying those non-duplicate email messages within the extracted range into an ordering of conversation thread length;

classifying those email messages whose content is recursively-included content within another of the tallied non-duplicate email messages as near-duplicate email messages;

designating the remaining email messages as unique email messages containing non-duplicative content:

storing the unique email messages in a store comprising a plurality of relative stores and folders corresponding to the email message stores from which each unique email message originated;

maintaining a log comprising an entry for each of the unique email messages, each log entry storing email message source location information and identification information for any such duplicate email message and near-duplicate email message related thereto; and maintaining a cross-reference keyed collection comprising an entry for each of the duplicate email messages and the near-duplicate email messages keyed to identification information for one such unique email message associated therewith.

20. A method according to claim 19, further comprising:
extracting the metadata for the email messages to be processed from the email message stores; and
sorting the metadata according to topic.

21. A method according to claim 20, further comprising:
sorting the metadata for the extracted range of topically identical email messages according to content prior to identifying the duplicate email messages.

22. A method according to claim 19, further comprising:
sorting the metadata for the non-duplicate email messages by content prior to tallying the non-duplicate email messages.

23. A method according to claim 19, further comprising:
verifying the duplicate email messages by comparing indicia in addition to the content stored therein.

24. A method according to claim 23, wherein the indicia comprises header information, further comprising:
comparing the header information stored with each of the duplicate email messages.

25. A method according to claim 19, further comprising:
determining each conversation thread length based on thread markers comprising at least one of keywords, delimiter strings, and relative location within each email message.

26. A method according to claim 19, further comprising:
storing the duplicate email messages and the near-duplicate email messages copied thereto by identifying the associated unique email message with the cross-reference keyed collection.

27. A method according to claim 19, wherein each email message store comprises a MAPI-compliant email message store.

28. A computer-readable storage medium holding code for performing the method of claim 19.

29. A system for categorizing email messages stored in email message stores into discrete categories, comprising:

a master array storing metadata for each email message to be processed from a plurality of email message stores, the metadata identifying the source email message store and relative storage location for the email message;

means for sorting the metadata according to topic and comparing content of email messages with similar topics to identify those email messages containing duplicative content;

means for sorting the email messages according to content by referencing the metadata and ordering the metadata in order of conversation thread length;

means for comparing the content to identify those email messages whose content is recursively-included content within another of the email messages; and means for identifying the remaining email messages by referencing the metadata as unique email messages;

means for storing the unique email messages and comprising a plurality of relative stores and folders corresponding to the email message stores from which each unique email message originated;

means for maintaining a log comprising an entry for each of the unique email messages, each log entry storing email message source location information and identification information for any such non-unique email message related thereto; and means for maintaining a cross-reference keyed collection comprising an entry for any such non-unique email message keyed to identification information for one such unique email message associated therewith.

30. A method for categorizing messages stored in email message stores into discrete categories, comprising:

extracting metadata for each email message to be processed from a plurality of email message stores, the metadata identifying the source email message store and relative storage location for the email message;

sorting the metadata according to topic and comparing content of email messages with similar topics to identify those email messages containing substantially duplicative content;

sorting the email messages according to content by referencing the metadata and ordering the metadata in order of conversation thread length;

comparing the content to identify those email messages whose content is recursively-included content within another of the email messages;

identifying the remaining email messages by referencing the metadata as unique email messages;

storing the unique email messages in a store comprising a plurality of relative stores and folders corresponding to the email massage stores from which each unique email message originated;

maintaining a log comprising an entry for each of the unique email messages, each log entry storing email message source location information and identification information for any such non-unique email message related thereto; and maintaining a cross-reference keyed collection comprising an entry for any such non-unique email message keyed to identification information for one such unique email message associated therewith.

* * * * *

UNITED STATES PATENT AND TRADEMARK OFFICE
CERTIFICATE OF CORRECTION

PATENT NO.         : 6,745,197 B2
APPLICATION NO.    : 09/812749
DATED              : June 1, 2004
INVENTOR(S)        : McDonald, David T.

It is certified that error appears in the above-identified patent and that said Letters Patent is hereby corrected as shown below:

Column 12,
Line 32, "email messages containing substantially duplicative" should read -- email messages containing duplicative --;
Line 35, "message stores;" should read -- message stores as extracted email messages; --;
Line 41, "messages comprising at least one of a email message" should read -- messages comprising at least one of an email message --;
Line 42, "storing a single occurrence of a given topic and a email" should read -- storing a single occurrence of a given topic and an email --;
Line 62, "a email message processor extracting metadata identify-" should read -- an email message processor extracting metadata identify- --.

Column 13,
Line 22, "a email message storing a single occurrence of a given" should read -- an email message storing a single occurrence of a given --.

Column 14,
Line 11, "containing substantially non-duplicative content;" should read -- containing non-duplicative content; --;
Line 22, "each of the duplicate email message and the near-" should read -- each of the duplicate email messages and the near- --.
Line 30, "topic" should read -- topic. --;
Line 32, "the duplicate message selector sorting the metadata for the" should read -- the duplicate email message selector sorting the metadata for the --.

Column 15,
Line 16, "email messages containing non-duplicative content:" should read -- email messages containing non-duplicative content; --.

Column 16,
Line 16, "tent within another of the email messages; and" should read -- tent within another of the email messages; --;
Lines 32, "30. A method for categorizing messages stored in email" should read -- 30. A method for categorizing email messages stored in email --;

UNITED STATES PATENT AND TRADEMARK OFFICE
CERTIFICATE OF CORRECTION

PATENT NO. : 6,745,197 B2
APPLICATION NO. : 09/812749
DATED : June 1, 2004
INVENTOR(S) : McDonald, David T.

It is certified that error appears in the above-identified patent and that said Letters Patent is hereby corrected as shown below:

Column 16, (cont'd),
Line 40, "tify those email messages containing substantially" should read -- tify those email messages containing --.

Signed and Sealed this

Twentieth Day of June, 2006

JON W. DUDAS
*Director of the United States Patent and Trademark Office*